(12) United States Patent
Schwarzelbach et al.

(10) Patent No.: US 8,549,921 B2
(45) Date of Patent: Oct. 8, 2013

(54) SENSOR FOR DETECTING ACCELERATION

(75) Inventors: Oliver Schwarzelbach, Itzehoe (DE);
Manfred Weiss, Itzehoe (DE); Volker Kempe, Lieboch (AT)

(73) Assignees: Fraunhofer-Gesellschaft zur Foererung der Angewandten Forschung E.V., Munich (DE); Maxim Integrated GmbH, Lebring (AT)

( * ) Notice: Subject to any disclaimer, the term of this patent is extended or adjusted under 35 U.S.C. 154(b) by 302 days.

(21) Appl. No.: 12/445,398

(22) PCT Filed: Oct. 12, 2007

(86) PCT No.: PCT/EP2007/060873
§ 371 (c)(1),
(2), (4) Date: Jan. 4, 2010

(87) PCT Pub. No.: WO2008/043831
PCT Pub. Date: Apr. 17, 2008

(65) Prior Publication Data
US 2010/0139401 A1 Jun. 10, 2010

(30) Foreign Application Priority Data
Oct. 12, 2006 (DE) .......................... 10 2006 048 381

(51) Int. Cl.
*G01P 15/125* (2006.01)
(52) U.S. Cl.
USPC ...................................................... 73/514.32
(58) Field of Classification Search
USPC .................... 73/514.01, 514.32, 488, 514.38
See application file for complete search history.

(56) References Cited

U.S. PATENT DOCUMENTS 4,699,006 A 10/1987 Boxenhorn
5,487,305 A * 1/1996 Ristic et al. ................ 73/514.32

(Continued)

FOREIGN PATENT DOCUMENTS

DE 3 638 390 A1 8/1987
DE 195 00 800 A1 12/1995

(Continued)

OTHER PUBLICATIONS

Lakdawala, H. et al., "Temperature Stabilization of CMOS Capacitive Accelerometers", Journal of Micromechanics and Microengineering, vol. 14, pp. 559-566, (2004).

(Continued)

*Primary Examiner* — Peter J Macchiarolo
*Assistant Examiner* — Samir M Shah
(74) *Attorney, Agent, or Firm* — Hunton & Williams LLP

(57) ABSTRACT

Exemplary embodiments relate to a sensor for detecting an acceleration acting on the sensor, having: a substrate, a mass unit, which acts as an inert mass in the event of the presence of an acceleration, a fixing structure, wherein the mass unit is articulated on the substrate in such a way that at least one pivot axis is defined, about which the mass unit can perform a rotation relative to the substrate as a result of an acceleration acting on the sensor, and the mass unit has an interial center of gravity, which is at a distance from the respective pivot axis, and at least one detection unit, with which a change in position between the mass unit and the substrate may be detected. The detection unit is arranged with respect to the mass unit in such a way that a deformation of the mass unit cannot be transferred to the detection unit.

18 Claims, 1 Drawing Sheet

(56) References Cited

U.S. PATENT DOCUMENTS

| | | | |
|---|---|---|---|
| 5,591,910 A | 1/1997 | Lin | |
| 5,594,171 A * | 1/1997 | Ishida et al. | 73/514.32 |
| 5,806,365 A * | 9/1998 | Zunino et al. | 73/514.16 |
| 5,939,633 A * | 8/1999 | Judy | 73/514.32 |
| 5,962,787 A * | 10/1999 | Okada et al. | 73/514.32 |
| 5,992,233 A | 11/1999 | Clark | |
| 6,148,670 A * | 11/2000 | Judy | 73/514.32 |
| 6,159,761 A * | 12/2000 | Okada | 438/53 |
| 6,223,598 B1 * | 5/2001 | Judy | 73/514.32 |
| 6,338,274 B1 * | 1/2002 | Carroll | 73/514.15 |
| 6,936,492 B2 * | 8/2005 | McNeil et al. | 438/50 |
| 7,258,011 B2 * | 8/2007 | Nasiri et al. | 73/514.32 |
| 7,487,661 B2 * | 2/2009 | Ueda et al. | 73/1.39 |
| 7,520,169 B2 * | 4/2009 | Schwarzelbach | 73/504.12 |
| 7,578,190 B2 * | 8/2009 | Lin et al. | 73/514.29 |
| 7,628,072 B2 * | 12/2009 | Koury et al. | 73/514.32 |
| 7,637,160 B2 * | 12/2009 | Koury et al. | 73/514.32 |
| 7,640,805 B2 * | 1/2010 | Diamond et al. | 73/514.32 |
| 7,757,393 B2 * | 7/2010 | Ayazi et al. | 29/847 |
| 7,767,483 B1 * | 8/2010 | Waters | 438/51 |
| 7,793,542 B2 * | 9/2010 | Schultz | 73/510 |
| 7,849,742 B2 * | 12/2010 | Wang et al. | 73/514.32 |
| 7,851,876 B2 * | 12/2010 | Ramamoorthi et al. | 257/419 |
| 2002/0002864 A1 * | 1/2002 | Kvisteroey et al. | 73/504.12 |
| 2004/0055382 A1 * | 3/2004 | Samuels et al. | 73/514.38 |
| 2005/0005698 A1 * | 1/2005 | McNeil et al. | 73/514.32 |
| 2005/0097957 A1 * | 5/2005 | McNeil et al. | 73/514.01 |
| 2006/0213268 A1 * | 9/2006 | Asami et al. | 73/514.16 |
| 2007/0113653 A1 * | 5/2007 | Nasiri et al. | 73/510 |
| 2007/0194857 A1 * | 8/2007 | Schwarzelbach | 331/23 |
| 2009/0031809 A1 * | 2/2009 | Lin et al. | 73/514.32 |

FOREIGN PATENT DOCUMENTS

| | | |
|---|---|---|
| DE | 199 28 307 A1 | 12/1999 |
| EP | 0 971 208 A2 | 1/2000 |
| EP | 0 971 208 A3 | 10/2000 |
| EP | 1 416 250 A2 | 5/2004 |
| EP | 1 416 250 A3 | 7/2006 |
| EP | 0 971 208 B1 | 11/2006 |
| WO | 01/79862 | 10/2001 |
| WO | 2005/098358 A2 | 10/2005 |
| WO | 2005/098358 A3 | 10/2005 |

OTHER PUBLICATIONS

Selvakumar, A. et al., "A High Sensitivity Z-Axis Torsional Silicon Accelerometer", IEEE, IEDM 96-765-96-768, (1996).

* cited by examiner

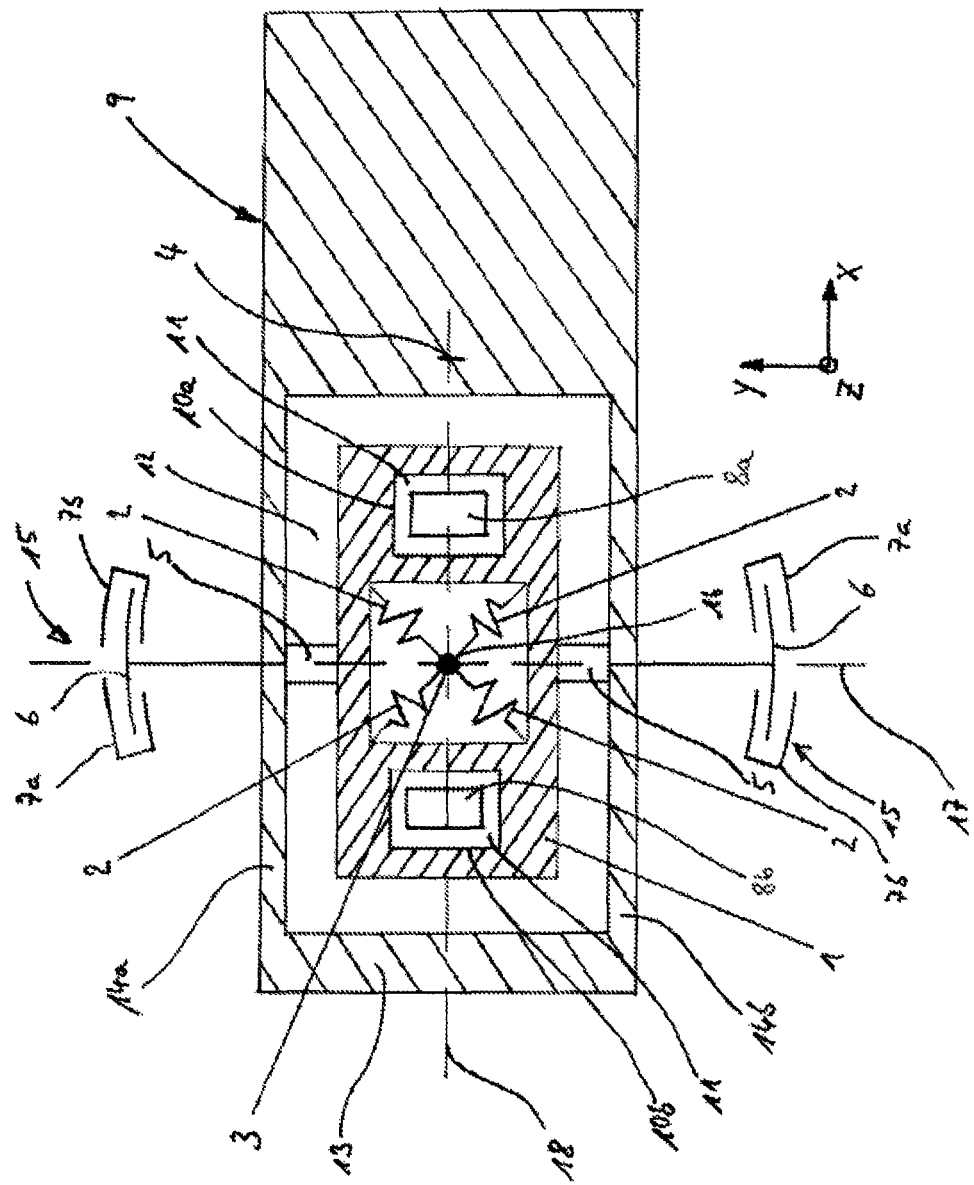

SENSOR FOR DETECTING ACCELERATION

CROSS-REFERENCE TO RELATED APPLICATIONS

This application is the U.S. National Stage filing of International Application No. PCT/EP07/60873, filed Oct. 12, 2007, which claims priority to German Patent Application No. 10 2006 048 381.2, filed Oct. 12, 2006, the disclosures of which are hereby incorporated by reference.

FIELD OF THE INVENTION

The present invention relates to a sensor for detecting acceleration in one or two axial directions and in particular relates to a micromechanical sensor.

BACKGROUND OF THE INVENTION

Such micromechanical sensors are known for detecting accelerations of rotational and translational movements. They are typically fabricated on the basis of conventional etch techniques from a wafer, for instance made of silicon, and generally comprise a substrate forming a supporting structure, which during an intended use of the acceleration sensor is mostly firmly connected to a system whose acceleration is to be detected. The substrate usually represents the reference system for the sensor the acceleration of which is to be determined. By means of a support structure a mass unit is resiliently connected with the substrate and is symmetrically or asymmetrically arranged. In the former case, for example, it may centrally be suspended via springs at four anchors that are outwardly positioned. In the latter case at least a pivot axis is defined around which the mass unit performs a rotation relatively to the substrate due to an acceleration acting on the sensor. The mass unit is then configured such that it has a center of gravity that is offset from the corresponding pivot axis. Furthermore, the sensor has in each case at least a detection unit, by means of which a change in position between the mass unit and the substrate caused by an acceleration acting on the sensor is detectable.

The center of gravity of the mass unit offset from the pivot axis is, for example defined in such a manner that the mass unit is axis-asymmetrically configured with respect to the pivot axis or the mass unit consists of material of different density. The mass unit is connected with the corresponding detection units in a conventional manner by means of a frame structure formed of bar-like components of the wafer.

Disadvantageously the mass unit forming the inertial mass suffers from a relatively strong shape specific thermal expansion behavior due to its asymmetric shape or its differing expansion behavior of possibly existing different materials or cover layers. Furthermore, stresses caused by the manufacturing are present in the wafer material or any other material, which stresses are released via the shape of the sensor. This means that the shape of the mass unit deviates from a shape required for a precise detection of accelerations, which is increased in particular in the presence of temperature variations. In this case the mass unit does not expand in a uniform manner but the occurring expansions strongly differ in different areas. The inner stresses and the shape specific thermal expansion behavior of the mass unit therefore result in particular in a twisting or distortion of the mass unit, wherein it partly significantly bends out of the main extension plane of the sensor.

The non-uniform changes in shape or expansions of the mass unit are disadvantageously transferred to the structure connecting the mass unit with the remaining components of the sensor and are transferred in particular to the detection units for detecting the change in position between the mass unit and the substrate. Therefore, partly pronounced measurement inaccuracies as well as temperature dependent measurement differences are obtained. These effects are in particular troublesome in acceleration sensors serving for the detection of small accelerations. Depending on the correspondingly used materials and the particular configuration of the structure of the sensor also at an acceleration of 0 G strong variations may occur across the entire temperature range, thereby making a tuning of the sensing virtually impossible.

Based on the prior art described above and the resulting disadvantages, it is an object of the present invention to provide a sensor for detecting accelerations, in particular a micromechanical sensor as described above, in which variations of measurement readings in particular due to the release of internal stresses as well as due to the occurrence of temperature dependent non-uniform expansions may mostly be avoided. In preferred embodiments, the sensor would be configured to detect the acceleration along two axes that are mutually orthogonal to each other.

BRIEF DESCRIPTION OF THE DRAWINGS

FIG. 1 is a cross-section of a sensor in accordance with exemplary embodiments.

DETAILED DESCRIPTION OF THE PREFERRED EMBODIMENTS

A sensor according to exemplary embodiments characterized by the detection unit being positioned such that, with respect to the mass unit, a deformation of the mass unit is not transferable to the detection unit.

The sensor according to various embodiments is usable for the detection of translational and rotational movements. Due to the inventive arrangement of the detection unit on the mass unit, a decoupling of the mass unit suffering from a non-uniform deformation behavior from the remaining components of the sensor is achieved. In this sense a decoupling is to be understood such that the mass unit is connected with the detection unit such that non-uniform deformations of the mass unit do not affect the remaining areas of the inventive sensor in a way that hereby measurement results are not influenced in a manner or even falsified such that they would have to be discarded as unusable or at least as imprecise.

A pivot axis is to be understood as a virtual axis in space around which the mass unit may rotate. The corresponding pivot axis does not need to be physically provided, for instance, in the form of a hinge axis or in the form of one or more bearing structures, such as a pivot and the like, but it may possibly be constituted by such physical bearing structures or may coincide therewith. The corresponding pivot axis may be defined by an appropriate arrangement and selection of the support structure, in that the support structure may have a spring assembly, which is displaceable along the direction of the acceleration to be detected and which is bend resistant otherwise.

The substrate of the sensor may be a mechanical unit, configured in any appropriate manner, which is directly or indirectly connected with the system whose acceleration is to be detected such that the accelerations acting on the system are mostly transferred to the substrate in a substantially unaltered manner. The substrate thus represents the point of reference of the system to be measured and is connected with the remaining functional units of the sensor. Also, the substrate is a part of a structure formed from a wafer and bearing the remaining functional units of the sensor.

According to an embodiment, the mass unit may be configured as a disc-like element. In this sense, a disc-like element is to be understood as an element that substantially extends into mutually orthogonal spatial directions, while its extension along a third direction that is orthogonal to the former spatial directions is negligibly small. Such a mass unit may manufacturable as a micromechanical element from a wafer of the corresponding desired material, or from a corresponding desired material composition by using conventional etch techniques. The element is usable in a sensor formed from a wafer as a chip. The disc-like mass unit may be configured such that it may undergo changes in shape, wherein these changes are not transferred or conducted to the detection unit irrespective of its arrangement, thereby resulting therein in a possible deformation.

The mass unit may be configured in an axis-asymmetric manner with respect to each pivot axis. Such a mass unit may be manufacturable as an area-like unit with a center of gravity offset from the corresponding pivot axis. The distance of the center of gravity from the pivot axis is determined by the geometric shape of the mass unit only, thereby not requiring additional measures, which may possibly result in additional costs, such as the usage of materials having a higher density or having an increased thickness.

According to an embodiment, the mass unit may have a bearing area formed in an axis-symmetric manner with respect to each pivot axis, at which bearing area the support structure and at least one detection unit is positioned. Since the bearing area is formed in an axis-symmetric manner with respect to the corresponding pivot axis, it substantially does not suffer from deformations occurring non-uniformly across the bearing area and transferable to the substrate and the detection unit, which could result in a falsification of the measurement results. In this respect it is to be appreciated that the bearing area does not need to be configured symmetrically in all spatial directions. Rather, it may be sufficient for the bearing area to be configured in a symmetric manner such that deformations resulting from an asymmetry are not transferred to the detection unit.

According to an embodiment, the mass unit may have a cavity in which the bearing area is positioned. The cavity is formed in the mass unit such that it is surrounded by a closed frame structure formed from the remaining material around the cavity of the mass unit. The structures forming this frame may serve, on the one hand, as a support structure for attaching the mass unit to the remaining components of the sensor and may, on the other hand, form an elastic structure that assists in reducing stresses and deformations of the mass unit. Due to the closed frame structure, the mass unit has a high stability that reduces deformations along a direction of the planar extension of the mass unit. The configuration of the mass unit in as much a symmetric manner as possible and the frame structure thereof counteract an asymmetric deformation behavior, such as a twisting or distortion out of the plane of the wafer in an efficient manner.

The bearing area and the mass unit may be connected with each other by a rigid rod or bar-like element according to an embodiment of the invention. This bar-like element is connected to the mass unit at its frame structure enclosing the cavity such that deformations and stresses of the mass unit are not or only in a substantially reduced manner coupled into the bar-like element. The bar-like element may be configured such that changes in position of the mass unit caused by inertia only can be transferred to the detection unit, while at the same time a transfer of deformations and stresses of the mass unit may be avoided or at least significantly reduced.

In this manner, the support structure may be positioned such at the substrate that a section of two mutually orthogonal pivot axes defines an anchor point on which the mass unit is rotatable with two degrees of freedom. Such a sensor may detect translational and rotational acceleration components in two mutually orthogonal directions. Furthermore, the bearing of the functional units, which are moved with respect to the substrate when being acted upon by an acceleration, at the substrate may be formed in a particularly efficient and robust manner. A restriction of the moveability of the mass unit with respect to the substrate may be avoided.

In order to configure the above-described sensor in particular as a micromechanical two-axes acceleration sensor the sensor may have at least one detection unit with which a change in position between the mass unit and the substrate caused by an acceleration of the sensor acting in a first direction may be detectable, and at least one further detection unit, with which a change in position between the mass unit and the substrate caused by an acceleration of the sensor in a second direction may be detectable.

According to an embodiment, it is proposed that said or the at least one detection unit or detection units is or are positioned at the bearing area, since changes in shape of the mass unit are not directly transferred to the bearing area and to the detection unit(s) connected thereto and thus in this manner none of the detection units is negatively affected by such a change in shape. Falsification of measurement results obtained by the sensor may be avoided.

However, it is possible that at least one detection unit may be disposed on the frame structure of the mass unit. In this case, care has to be taken that the detection unit is positioned such that possibly occurring deformations of the mass unit may not result in a negative influence on the detection unit. For this purpose, according to exemplary embodiments, it is proposed that the corresponding detection unit may be disposed symmetrically with respect to the cavity on the perimeter surrounding the cavity.

The respective two detection units may be disposed opposite to each other on the bearing area and/or the frame structure of the mass unit in order to detect changes in position of the mass unit in one direction. The detection units may be metrologically connected to each other such that their measurement signals are summed up and are therefore appropriate for a metrological processing.

The detection units may be provided as capacitive measurement units that are, for instance, constituted in the form of differential capacitors formed from electrode combs.

The following is a non-limiting description of exemplary embodiments, illustrated by referring to FIG. 1, in which a two-axes acceleration sensor is schematically illustrated in accordance with an exemplary embodiment of the present invention. For the purpose of a simplified description a Cartesian coordinate system is illustrated in FIG. 1 and is referred in the following description of the sensor.

The acceleration sensor illustrated may have a mass unit 9, which is connected to a substrate 3 constituting a supporting structure by means of flexible springs 2. Although not shown in FIG. 1. the substrate 3 may be fixedly connected with an arbitrary unit whose acceleration is to be detected by means of the sensor illustrated.

The mass unit 9 is a flat disc-like element that substantially extends in the direction of the X-axis and the Y-axis and whose extension in the direction of the Z-axis is negligibly small with respect to the former extensions. The mass unit is provided with a cavity 12 disposed in an asymmetric manner with respect to the overall shape, that is, it is disposed in a non-centered manner. The cavity is surrounded by an edge area 13 forming a closed frame. Due to the asymmetric arrangement of the cavity 12, the mass unit 9 is configured in an axis-asymmetric manner with respect to the substrate 3 and with respect to the Y-axis and the Z-axis, and therefore its center of gravity 4 is offset from each of the pivot axes 18 (along the Z direction) and 17 (along the Y direction) extending through the intersection 16 of the four flexible strings 2. With respect to the X-axis, the mass unit 9 is axis-symmetrically configured, its center of gravity 4 is thus positioned on the X-axis. An electrode comb 6 is disposed on oppositely arranged side structures 14a and 14b of the edge area 13 at centers of the side structures 14a and 14b, respectively. The electrode combs constitute together, with external electrode combs 7a, 7b, a differential capacitor 15. The external electrode combs 7a, 7b are of fixed location with respect to the substrate 3 and are arranged in a non-displaceable manner.

The mass unit 9 may have a bearing area 1 disposed within the cavity 12. The bearing area may have two cavities 10a and 10b, each of which may have a counter electrode 8a, 8b, respectively. The bearing area 1 may be configured in an axis-symmetric manner with respect to all three axes of the coordinate system used in FIG. 1, for which reason its center of gravity is in the section 16 of the pivot axes 17 and 18. The counter electrodes 8a, 8b may be stationary with respect to the substrate 3 and are not moveable. The bearing area 1 may be a differential capacitor 11 together with the counter electrodes 8a, 8b. Any changes in position of the counter electrodes 8a, 8b relative to the bearing unit 1 result in a change of the differential capacitance of the differential capacitor 11, which may be converted into a voltage proportionally to the acceleration by means of a circuit not illustrated in FIG. 1.

The two-axes acceleration sensor illustrated in FIG. 1 may serve for detecting accelerations having directional components along the Y-axis and/or the Z-axis. By means of the illustrated sensor, acceleration components along the X-axis may not be detected. In order to detect such acceleration components, a corresponding second sensor may be used that is rotated by 90° with respect to the illustrated acceleration sensor.

When an acceleration in the direction of the Y-axis acts on the device bearing the sensor and being coupled thereto via the substrate 3, the mass unit 9 causes a rotation of the entire sensor, except for the substrate 3 around the intersection 16 due to the mass unit's non-centered mass distribution with respect to the intersection 16 of the pivot axes 17 and 18. A corresponding rotation around the substrate 3 is possible due to the resilient properties of the flexible springs 2 acting in this direction. The torque acting due to the non-centered mass distribution around the intersection 16 is directly proportional to the magnitude of the effective acceleration. This torque is counteracted by the restoring force exerted to the bearing area 1 by the flexible springs 2, wherein the restoring force is proportional to the existing displacement. From the magnitude of a change in position or a rotation of the bearing area 1 with respect to the substrate 3 caused by a certain acceleration, a direct calculation may be made to the magnitude of the correspondingly acting acceleration.

The rotation of the bearing area 1 with respect to the substrate 3 caused by an acceleration along the direction of the Y-axis results in a displacement of the electrode combs 6 with respect to the external electrode combs 7a, 7b. This displacement results in a change in the differential capacitances of the differential capacitor 15, which may be converted into a voltage proportional to the acceleration by an appropriate circuit, whose voltage may in turn be used for determining the magnitude of the corresponding existing acceleration.

Upon an acceleration exclusively acting along the Y-axis, the previously described movement represents the only relative displacement between the substrate 3 and the mass unit 1. Such an acceleration does therefore not lead to a relative displacement of the counter electrodes 8a, 8b with respect to the bearing unit 1.

Once an acceleration acts on the sensor along the Z-direction, the mass unit 9 will cause, due to the non-centered mass distribution of the mass unit, a rotation around the Y-axis of a common anchor point defined by the substrate 3 and the flexible springs 2, being congruent with the intersection 16. Due to the non-twistable connection of the bearing area 1 with the mass unit 9 constituted by the connection bar 5, the bearing area 1 performs a rotation around the Y-axis of the common anchor point in the same manner. This rotation results in a relative displacement of the counter electrodes 8a, 8b within cavities 10a, 10b in the bearing unit 1. As already explained in the context of an acceleration in the Y-direction, in this case also a displacement of the electrode combs 6 relative to the external electrode combs 7a, 7b will not occur due to an acceleration merely acting along the Z-direction.

As is particularly evident from FIG. 1, the bearing area 1 is formed symmetrically with respect to both differential capacitors 11 and 15. Upon changes in temperature, it may expand generally in a symmetric manner such that a displacement of the electrode combs 6 with respect to the external electrode combs 7a, 7b or the counter electrodes 8a, 8b relative to the bearing area 1 due to thermal expansion does not occur.

Should, however, the axis-asymmetric periphery of the mass unit suffer from a thermal expansion due to temperature fluctuations, these expansions would not be distributed across the mass unit 9 in a uniform manner according to the non-uniform mass distribution and the asymmetric shape. Due to these varying and shape specific thermal expansions, changes in shape may occur upon changes in temperature. In particular, a curvature could occur around the Y-axis outwardly from the drawing plane, for example, along the direction of the Z-axis. Such deformations are not transferred to the bearing unit 1 due to the connection between the frame structure of the mass unit 9 and the bearing unit 1 obtained by the rigid bar 5 and thus these deformations cannot result in a relative displacement of the counter electrodes 8a, 8b with respect to the bearing area 1. The same may hold true for the differential capacitor 15 constituted by the electrode combs 6 and the external electrode combs 7a, 7b.

The invention claimed is:

1. A sensor for detecting an acceleration acting on the sensor, comprising:
   a substrate;
   a mass unit acting as an inertial mass in the presence of the acceleration;
   a support structure, jointly coupling the mass unit to the substrate, wherein the mass unit is jointly connected to the substrate such that at least one pivot axis is defined around which the mass unit can perform a rotation relative to the substrate due to the acceleration acting on the sensor, and the mass unit comprises a centre of gravity offset from the at least one pivot axis; and
   at least one detection unit, with which a change in position between the mass unit and the substrate is detectable, and the at least one detection unit is a capacitor,
   wherein the at least one detection unit is positioned, with respect to the mass unit, such that a deformation of the mass unit is not transferable to the detection unit; and wherein the support structure is positioned on the substrate such that an intersection of two mutually orthogonal pivot axes defines an anchor point around which the mass unit is rotatable according to two degrees of freedom.

2. The sensor according to claim 1, wherein the mass unit comprises a disc-like element.

3. The sensor according to claim 1, wherein the mass unit is axis-asymmetrically formed with respect to each pivot axis.

4. The sensor according to claim 1, wherein the mass unit comprises a bearing area that is axis-symmetrically formed with respect to the at least one pivot axis, on which the support structure and at least one detection unit are disposed.

5. The sensor according to claim 4, wherein the bearing area and the mass unit are connected to each other by a rigid rod shaped or bar shaped element.

6. The sensor according to claim 5, wherein the longitudinal axis of the rigid rod shaped or bar shaped element coincides with the at least one pivot axis.

7. The sensor according to claim 4, wherein the mass unit comprises a cavity in which the bearing area is disposed.

8. The sensor according to claim 7, wherein the at least one detection unit is located on the mass unit centrally on the edge surrounding the cavity.

9. The sensor according to claim 8, wherein the at least one detection unit serves for detecting changes in position in a plane of the mass unit.

10. The sensor according to claim 4, wherein the at least one detection unit disposed in the bearing area serves for detecting changes in position orthogonal to a plane of the mass unit.

11. The sensor according to claim 4, wherein two detection units for detecting a change in position in one direction are provided on the bearing area.

12. The sensor according to claim 1, wherein the sensor comprises at least one detection unit with which a change in position between the mass unit and the substrate caused by the acceleration acting on the sensor acting in a first direction is detectable, and at least one further detection unit with which a change in position between the mass unit and the substrate caused by an acceleration of the sensor acting along a second direction is detectable.

13. The sensor according to claim 1, wherein the support structure comprises a spring assembly that is displaceable along the direction of acceleration to be detected and is substantially bend resistant otherwise.

14. The sensor according to claim 1, wherein the capacitor is a differential capacitor formed from electrode combs.

15. The sensor according to claim 1, wherein it is formed from a wafer comprising a micromechanical device.

16. The sensor according to claim 15, wherein the wafer comprises a silicon wafer.

17. The sensor according to claim 1, wherein the mass unit comprises a bearing area on which the support structure and at least one detection unit are disposed;
   the bearing area and the mass unit are connected to each other by a rigid element; and
   the sensor comprises at least one detection unit with which a change in position between the mass unit and the substrate caused by the acceleration acting on the sensor acting in a first direction is detectable, and at least one further detection unit with which a change in position between the mass unit and the substrate caused by an acceleration of the sensor acting along a second direction is detectable.

18. A sensor for detecting an acceleration acting on the sensor, comprising:
   a substrate;
   a mass unit acting as an inertial mass in the presence of the acceleration;
   a support structure, jointly coupling the mass unit to the substrate, wherein the mass unit is jointly connected to the substrate such that at least one pivot axis is defined around which the mass unit can perform a rotation relative to the substrate due to the acceleration acting on the sensor, and the mass unit comprises a centre of gravity offset from the at least one pivot axis; and
   at least one detection unit, with which a change in position between the mass unit and the substrate is detectable, the at least one detection unit is a differential capacitor formed from electrode combs,
   wherein the at least one detection unit is positioned, with respect to the mass unit, such that a deformation of the mass unit is not transferable to the detection unit; and
   wherein the support structure is positioned on the substrate such that an intersection of two mutually orthogonal pivot axes defines an anchor point around which the mass unit is rotatable according to two degrees of freedom.

* * * * *

UNITED STATES PATENT AND TRADEMARK OFFICE
CERTIFICATE OF CORRECTION

PATENT NO. : 8,549,921 B2  
APPLICATION NO. : 12/445398  
DATED : October 8, 2013  
INVENTOR(S) : Oliver Schwarzelbach et al.

It is certified that error appears in the above-identified patent and that said Letters Patent is hereby corrected as shown below:

Title Page

Item (73) Assignees: should read: Fraunhofer-Gesellschaft Zur Foerderung Der Angewandten Forschung E.V., Muenchen (DE); Maxim Integrated GmbH, Lebring (AT)

Signed and Sealed this  
Twenty-fourth Day of June, 2014

Michelle K. Lee  
*Deputy Director of the United States Patent and Trademark Office*

UNITED STATES PATENT AND TRADEMARK OFFICE
CERTIFICATE OF CORRECTION

PATENT NO. : 8,549,921 B2  Page 1 of 1
APPLICATION NO. : 12/445398
DATED : October 8, 2013
INVENTOR(S) : Schwarzelbach et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 690 days.

Signed and Sealed this

Fifteenth Day of September, 2015

Michelle K. Lee
*Director of the United States Patent and Trademark Office*